Dec. 15, 1970 J. V. ROGERS 3,548,220

FAST RECOVERY MONOSTABLE MULTIVIBRATOR AND METHOD

Filed Feb. 1, 1967

INVENTOR.

John V. Rogers

BY Fehr, Hohbach, Test, Albritton & Herbert

Attorneys

United States Patent Office 3,548,220

Patented Dec. 15, 1970

3,548,220

FAST RECOVERY MONOSTABLE MULTIVIBRATOR AND METHOD

John V. Rogers, Walnut Creek, Calif., assignor to W. K. Rosenberry, doing business as Zeta Research, Lafayette, Calif.

Filed Feb. 1, 1967, Ser. No. 613,278

Int. Cl. H03k *3/10*

U.S. Cl. 307—273 4 Claims

ABSTRACT OF THE DISCLOSURE

The present invention relates to a fast recovery monostable multivibrator and method utilizing switching means comprising at least two active semiconductor elements which are cross-coupled to form a regenerative loop. Charge storage means is connected in parallel to the switching means and depending on the state of the switching means, the charging means is sequentially prevented from changing its charge, being permitted to change its charge or being rapidly returned to its original level of charge.

This invention relates to an apparatus and method for generating electrical pulses in response to externally applied trigger signals. Circuits with similar functions, called monostable multivibrators, are well known in the state of the art.

Monostable multivibrators with fast recovery times are frequently required. Fast recovery means that the time required for the circuit to return to the original from the termination of the pulse state is substantially less than 10 percent of the duration of the generated pulse. Such fast recovering monostable multivibrators are also known in the state of the art but usually they utilize very complex electrical circuitry. Therefore, there is a need for a new and improved apparatus and method for generating waveforms with rapid recovery.

In general, it is the object of the present invention to provide a very simple multivibrator apparatus and method for generating waveforms with rapid recovery.

Another objective of the invention is to provide an apparatus and method of the above character with a very large range of control of pulse width.

Another object of the invention is to provide an apparatus and method of the above character with a very large ratio of charge to discharge time or in other words pulse width to recovery time.

Another object of the invention is to provide an apparatus and method of the above character where the recovery time tends to be a constant fraction of the pulse width rather than a constant interval of time.

Another object of the invention is to provide an apparatus and method of the above character which permits very high pulse duty factors.

Another object of the invention is to provide an apparatus and method of the above character which permits remote location of both the fine and the coarse pulse width controls.

Another object of the invention is to provide an apparatus and method of the above character which provides clean and fast input pulses having an amplitude governed essentially by the supply voltage.

Another object of the invention is to provide an apparatus and method of the above character which is capable of operating on a single power supply.

Another object of the invention is to provide an apparatus and method of the above character whose input characteristic provides a large amount of isolation between its output pulse and the trigger source.

Additional objects and features of the invention will appear from the following description in which the preferred embodiment is set forth in detail in conjunction with the accompanying drawings.

Referring to the drawings.

Figures 1, 2:
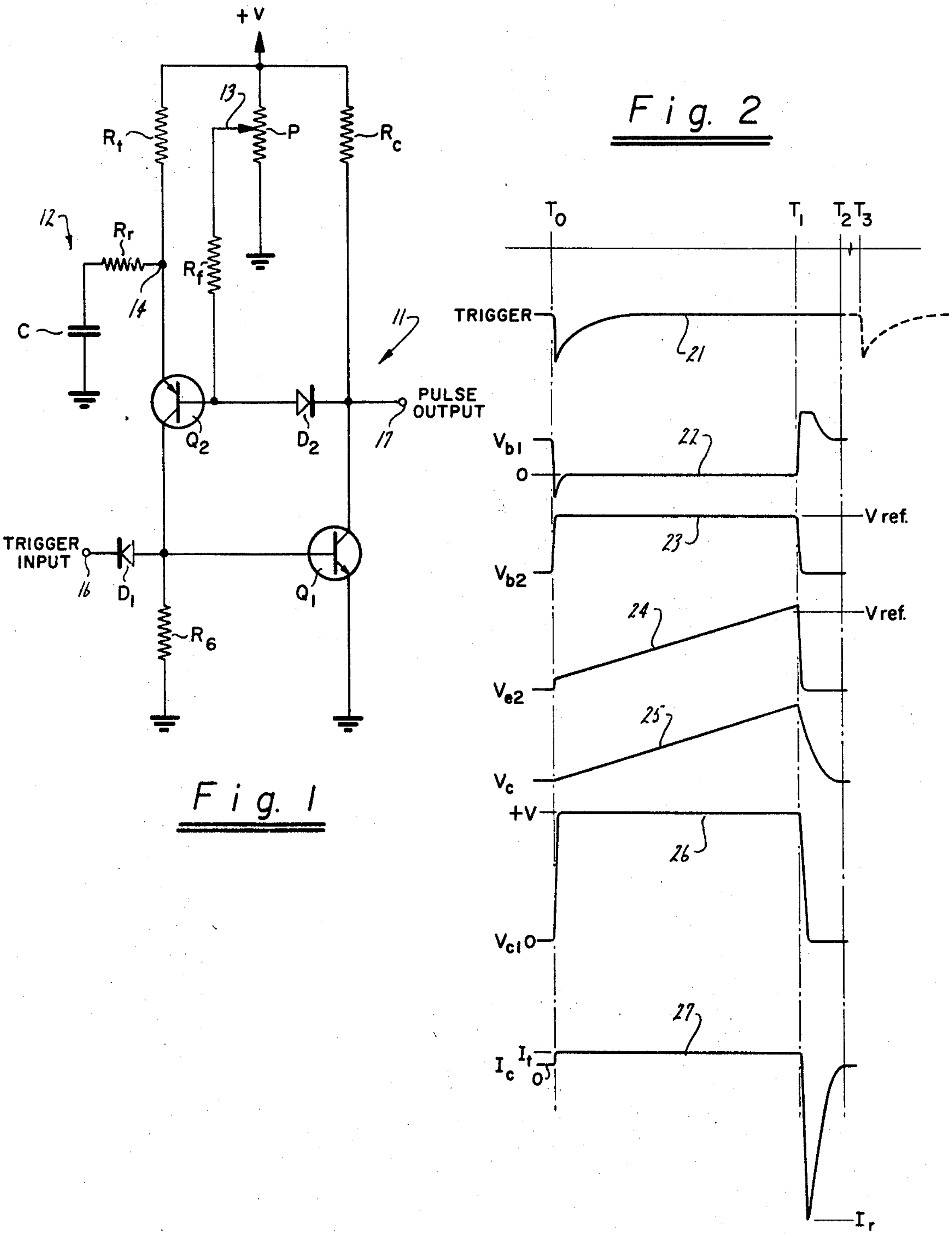
FIG. 1 is a circuit diagram of the fast recovery monostable multivibrator incorporating the present invention and which is utilized for performing the present method.
FIG. 2 is a chart showing the time relationship between the trigger input and the waveforms generated by the circuit shown in FIG. 1.

As shown in FIG. 1, the fast recovery monostable multivibrator consists of a switching means 11 and a charge storage means 12 which is connected to the switching means. The switching means consists of at least two active non-linear semiconductor elements. By way of example, these semiconductor elements can consist of a complementary pair of transistors $Q_1$ and $Q_2$ in which $Q_1$ can be of the NPN type and $Q_2$ of the PNP type. As hereinafter explained, these transistors can be reversed.

Each of these transistors includes base emitter and collector elements. These transistors $Q_1$ and $Q_2$ are cross-coupled to form a regenerative feedback loop. By this it is meant that the collector of each transistor is coupled either directly or indirectly to the base of the other transistor. As shown in FIG. 1, the collector of $Q_1$ is connected through a diode $D_2$ to the base of the transistor $Q_2$ and the collector of the transistor $Q_2$ is directly connected to the base of the transistor $Q_1$.

A power supply is provided for supplying a positive voltage $+V$ to the switching means. As shown on the drawing, the power supply is connected to the collector of the transistor $Q_1$ through the collector impedance $R_c$ and to the emitter of the transistor $Q_2$ through the emitter resistance $R_t$. As hereinafter explained, the resistance $R_t$ serves as a timing impedance. A potentiometer P has one end connected to the positive voltage supply and has the other end connected to ground. The wiper 13 of the potentiometer P is utilized for obtaining a reference voltage level identified as $V_{ref}$. The wiper of the potentiometer is connected through the impedance $R_f$ to the base of the transistor $Q_2$. The emitter of the transistor $Q_1$ is connected to a suitable potential level such as ground and the collector of the transistor $Q_2$ may also be connected to ground through the base impedance $R_b$ for the base of the transistor $Q_1$.

The charge storage means 12 which has two terminals consists of a capacitor C in series with a resistor $R_r$. One of the terminals is connected to a predetermined voltage level such as ground. The other terminal of the charge storage network is connected to a terminal 14 which is connected to the emitter of the transistor $Q_2$. As hereinafter explained, the resistor $R_t$ is the element which essentially determines the charging rate of the capacitor C whereas the value of the resistance $R_r$ predominantly controls the rate of discharge of the capacitor C.

Trigger input signals are utilized for triggering the multivibrator and are supplied to an input terminal 16 which is connected to a diode $D_1$. The other terminal of $D_1$ is thence connected to the base of the transistor $Q_1$. In the embodiment of the invention shown in FIG. 1, the trigger input pulse normally takes the form of a negative input trigger pulse. The pulse output from the multivibrator is normally obtained from the collector terminal of the transistor $Q_1$ and, as shown, is obtained from the output terminal 17. The location of the terminal at this point has the advantage in that it eliminates the effect of loading upon the timing cycle. Other appropriate points can be utilized for receiving outputs from a multivibrator such as at point 14.

FIG. 2 is a diagram showing various waveforms generated by the circuit of FIG. 1. Curve 21 shows the negative trigger input pulse. Curves 22 and 23 also identified as $V_{b1}$ and $V_{b2}$ are the waveforms obtained at the base terminals of transistors $Q_1$ and curve 25 or $V_c$ shows the voltage across capacitor C. Curve 26 or $V_{c1}$ shows the collector waveform of transistor $Q_1$ which serves as the output pulse. Curve 27 of $I_c$ shows the current during charge and discharge into capacitor C. $T_0$ marks the time when the negative trigger input pulse is applied to the input terminal 16. $T_1$ marks the time when curve 24 or $V_{e2}$ exceeds $V_{ref}$ by a value sufficient to turn $Q_2$ on and also marks the beginning of the recovery time. $T_2$ is the end of the recovery time. By time $T_2$ all waveforms have returned to their original states which they had preceding the time $T_0$. At this time the multivibrator is in a condition to receive the next trigger input pulse. $T_3$ indicates an arbitrary time after $T_2$ showing the next trigger input pulse.

The operation of the multivibrator circuit shown in FIG. 1 in performing the present method may now be briefly described in conjunction with the waveforms shown in FIG. 2.

Initially both transistors $Q_1$ and $Q_2$ are in the conducting state and are conducting currents at a level set by their collector and emitter impedances respectively. Referring to FIG. 2, at time $T_0$ when the negative trigger input signal applied to diode $D_1$ cuts transistor $Q_1$ off as shown by curve 22, a portion of the positive going collector waveform as shown by curve 26 is applied to the base of transistor $Q_2$. This waveform is shown as curve 23 and cuts off transistors $Q_2$. This reinforces the trigger action at the base of $Q_1$. The base of $Q_2$ then rises to the voltage $V_{ref}$ set by the potentiometer as shown by curve 23. The emitter of $Q_2$ is prevented from following the base of $Q_2$ because of the action of the timing capacitor C as shown by curve 24. At a time $T_1$ later than $T_0$ governed by the charging of C through $R_t$ and $R_r$, the emitter turns $Q_2$ on, terminates the pulse output, and initiates the recovery period. The emitter current is passed through $Q_2$ to the base of $Q_1$ where it is amplified and returned to the base of $Q_2$ thus regeneratively discharging C with a heavy current from the emitter of $Q_2$ and quickly restoring the charge on C to the initial value it had before time $T_0$. The current in C is shown as $I_c$. The recovery portion of this current is shown as $I_r$ and has decayed to zero by time $T_2$. This marks the end of the recovery period and at any time $T_3>T_2$ the circuit may be retriggered with the same results as produced by the initial input trigger pulse.

The high duty factor available with this invention is due primarily to the large ratio of recovery current to timing current. Many previous multivibrators initiate the period by turning on both transistors and employing what in this invention is the recovery period as their timing period. They are, in effect, triggered at $T_1$ and have $T_1$ to $T_2$ as their width. It is not feasible to achieve a large ratio of recovery to timing current in this manner except by the addition of extra active elements such as emitter followers and clamping diodes. The present invention utilizes the inherently high impedance of $Q_1$ and $Q_2$ when in their "off" states as compared to the relatively low impedance of $Q_1$ and $Q_2$ when in their "on" states to achieve a high charge to discharge current ratio and, therefore, a high timing period to recovery period ratio. This is possible because the timing capacitor is in parallel with the impedance represented by transistors $Q_1$ and $Q_2$ and during the timing period no substantial timing current is shunted away from capacitor C by $Q_1$ and $Q_2$. Also, because C is in parallel with the impedance of $Q_1$ and $Q_2$, the recovery period can be short since the heavy discharge current flows through C and then through $Q_1$ and $Q_2$ and is not diminished by the effects of other impedances such as the power supply.

The multivibrator of FIG. 1 has three levels of current for its operation as seen in curve 27 in FIG. 2:

(1) Before time $T_0$.—The quiescent level, which is zero for the capacitor C, is set by circuit impedances for each transistor but in the transistors it represents a moderate current.

(2) Time $T_0$ to $T_1$.—The timing current level which is a small value $I_t$ for the capacitor and essentially is zero for both transistors. It is during this period that the pulse is generated and the width of the pulse is determined as $T_1—T_0$.

(3) Time $T_1$ to $T_2$.—The recovery current level which is a large value $I_r$ for the capacitor and is also $I_r$ for the transistors. This is a transient condition and is characterized by monotonic return to the quiescent levels by time $T_2$.

A very desirable feature by which the recovery period of the present multivibrator tends to remain a constant fraction of the timing period is produced by the manner in which the timing is determined. In many other types of multivibrators, the timing current is varied by some means while the voltage to which the timing waveform must rise $V_{ref}$ is held fixed. In such multivibrators then, the slope of the timing waveform is varied to produce various periods. Such other multivibrators must recover by discharging C through a potential $V_{ref}$ by means of a current $I_r$. This tends to require the same time regardless of the period that was generated, and when these periods are short, the recovery time may actually exceed the period.

In the present invention the timing current $I_t$ is held constant while the voltage $V_{ref}$ is varied. The voltage required to discharge C now depends on $V_{ref}$ in the same way in which the timing period depends on $V_{ref}$; that is, a long timing period implies a large $V_{ref}$, hence, a long recovery period, while a short timing period implies a small $V_{ref}$, hence, a short recovery period. This tends to keep the ratio of the timing to recovery period constant. In some embodiments of this invention, a ratio of 50 has been achieved.

High duty factors are readily obtained since the circuit may be retriggered shortly after the end of the timing period.

Another desirable feature is the ability to locate the source of $V_{ref}$ and the timing capacitor C at a remote location. Fine control of the width of the pulse is provided by varying $V_{ref}$ and coarse control is provided by changing the value of C by switching. Thus, complete control may be exercised over the pulse width from a point some distance from the circuit itself. The voltage, $V_{ref}$, need only be applied to the base impedance $R_f$ of $Q_2$. The capacitor C may be remotely located with no circuit performance degradation by employing a transmission line of characteristic impedance equal to $R_r$ to couple C and $R_r$ to the emitter of $Q_2$. This employs the principle that a transmission line which is terminated in its characteristic impedance is equivalent to that impedance, regardless of the length of the transmission line. $R_r$ then serves to terminate the transmission line through C to ground and prevents multiple reflections which otherwise would impair the performance of the multivibrator.

The use of the impedance $R_r$ is important from another standpoint than that just mentioned. It is the small voltage developed across this impedance which adds the step to the waveform at the base of $Q_2$ as shown in FIG. 2 in curve 23. This small step, when added to the timing waveform, produces a somewhat larger than normal voltage during the early portions of the timing waveform. The very short pulses would have required the detection of very small timing voltages if this extra voltage were not present. Its effect is to make it possible to turn on $Q_2$ (thereby ending the pulse and initiating the recovery period) after only a brief timing period has elapsed. Using this technique, some embodiments of the present invention have produced pulses which, for a particular value of C, may be controlled over a range of widths in excess of $10^4$ using the potentiometer P alone. This is an exceptional range of control for a single control and a single timing capacitor.

A few other features found in this invention include the requirement for only a single power supply. Other fast recovery multivibrators frequently require two or three power supply voltages.

The circuit has good isolation between input and output. Both the effect of the trigger upon the output pulse and the reaction of the output pulse on the trigger source are minimized by the decoupling effect of the input diode $D_1$ which becomes non-conducting after the circuit triggers. Even if the trigger is larger than required, the result is merely turn $Q_1$ further off with no appreciable effect since it is already off shortly after triggering occurs.

The output pulse may be taken from the collector of $Q_1$ and no effect on the timing is observed unless the impedance of the load is extremely low. In practical circuits, loads of several hundred ohms and more are easily driven.

A typical set of circuit values is as follows:

| | |
|---|---|
| $R_r$ | 50 ohms. |
| $R_t$ | 4700 ohms. |
| C | 0.2 $\mu$f. |
| $R_b$ | 4700 ohms. |
| $R_c$ | 390 ohms. |
| $R_f$ | 3300 ohms. |
| P | 10 ohms. |
| $Q_1$ | 2N2369. |
| $Q_2$ | 2N3640. |
| Diodes | FD 700. |
| +V | 12 volts. |

The above circuit produced pulses of more than 11 volts amplitude and had a range of widths from 100 ns. to 1000 ms. A negative 1 volt trigger was used and a recovery period of 20 ms. was obtained when a pulse period of 1000 ms. was generated. The recovery period was 0.5 ms. when the potentiometer P was set to produce an output pulse period of 10 ms.

Although the basic multivibrator incorporating the present invention is shown in FIG. 1, certain modifications can be utilized with the multivibrator if desired. For example, a diode can be added in series with the resistor $R_b$. Such a diode would give a temperature compensating effect to the bias conditions of $Q_1$ and renders the multivibrator operable over a wider temperature range. An emitter follower with its base connected to the emitter of $Q_2$ and its emitter to the capacitor C can be used to improve the recovery time by providing additional current to discharge the capacitor C. Either or both $R_t$ and $R_b$ can be replaced with an appropriate constant current source to provide a more linear relationship between $V_{ref}$ and the timing period $T_0-T_1$ and to improve the sharpness of the start of the recovery period. Separate comparison means can be provided for detecting when the timing waveform and $V_{ref}$ are equal and for initiating the start of the recovery period.

I claim:

1. In a monostable circuit for generating fast recovery electrical impulses in response to trigger input signals, switching means having at least input, timing and reference terminals which are independent from each other, said switching means comprising at least first and second active non-linear semiconductor elements and connecting means interconnecting said semiconductor elements to form a regenerative loop, said first and second semiconductor elements being of opposite conductivity types and each having base, emitter and collector terminals, said reference terminal being connected to the base of said first semiconductor element and said timing terminal being connected to the emitter of said first semiconductor element, two terminal charge storage means, means connected to one terminal at a predetermined constant voltage level, means connecting the other terminal of the charge storage means to said timing terminal of said switching means, a source of variable predetermined reference voltage whose value does not change during the cycle of operation connected to the reference terminal of said switching means and means for causing an initial predetermined level of current to be conducted exclusively through said switching means thereby maintaining the charge level in the charge storage element constant, said switching means substantially ceasing conduction upon receipt of a trigger signal on the input terminal to enable a monotonic change of charge on said charge storage element, said switching means also including comparator means for monitoring said monotonic change of charge and causing said switching means to resume conduction when a predetermined terminal level of charge is reached as determined by said reference voltage to provide a current path for the rapid return of the charge of the storage element to its initial predetermined level of charge.

2. Apparatus as in claim 1 wherein said semiconductors are cross-coupled with the base of each coupled to the collector of the other.

3. Apparatus as in claim 1 wherein said connecting means includes first coupling means connecting the base of one semiconductor to the collector of the other semiconductor and second coupling means connecting the base of said other semiconductor to the collector of said one semiconductor, said input terminal being connected to said first coupling means, said second coupling means including diode means.

4. Apparatus as in claim 1 wherein said comparator means consists of the base emitter junction of one of said semiconductors.

References Cited

UNITED STATES PATENTS

| | | | |
|---|---|---|---|
| 3,016,468 | 1/1962 | Moraff | 307—288 |
| 3,037,132 | 5/1962 | Skerritt | 307—273 |
| 3,354,323 | 11/1967 | Douaihy | 307—273 |
| 2,770,732 | 11/1956 | Chong | 307—273 |
| 2,840,727 | 6/1958 | Guggi | 307—288 |
| 2,901,669 | 8/1959 | Coleman | 307—288 |
| 2,937,291 | 5/1960 | Harper | 307—273 |
| 3,114,049 | 12/1963 | Blair | 307—288 |
| 3,191,064 | 6/1965 | Ih | 307—288 |
| 3,268,738 | 8/1966 | Deavenport | 307—273 |

OTHER REFERENCES

"Monostable Multivibrator," by Denis Dorsey, RCA Technical Note 658, November 1965. (Received U.S. Patent Office Jan. 16, 1966.

DONALD D. FORRER, Primary Examiner

HAROLD A. DIXON, Assistant Examiner

U.S. Cl. X.R.

307—288, 313